US010893561B2

(12) United States Patent
Wang

(10) Patent No.: US 10,893,561 B2
(45) Date of Patent: Jan. 12, 2021

(54) SIGNALING REDUCTION IN DUAL CONNECTIVITY NETWORKS

(71) Applicant: T-Mobile USA, Inc., Bellevue, WA (US)

(72) Inventor: Jun Wang, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 88 days.

(21) Appl. No.: 16/194,220

(22) Filed: Nov. 16, 2018

(65) Prior Publication Data

US 2020/0163139 A1 May 21, 2020

(51) Int. Cl.
| | |
|---|---|
| *H04W 76/15* | (2018.01) |
| *H04W 76/30* | (2018.01) |
| *H04W 36/00* | (2009.01) |
| *H04W 8/08* | (2009.01) |
| *H04W 88/10* | (2009.01) |
| *H04W 88/12* | (2009.01) |
| *H04W 16/14* | (2009.01) |

(52) U.S. Cl.
CPC ............ *H04W 76/15* (2018.02); *H04W 8/08* (2013.01); *H04W 36/0069* (2018.08); *H04W 76/30* (2018.02); *H04W 88/10* (2013.01); *H04W 88/12* (2013.01); *H04W 16/14* (2013.01)

(58) Field of Classification Search
None
See application file for complete search history.

(56) References Cited

FOREIGN PATENT DOCUMENTS

WO 2016013890 A1 1/2016

OTHER PUBLICATIONS

3GPP TSG-RAN WG3#101bis Chengdu, China, Oct. 8-12, 2018, R3-186267 (Year: 2018).*
European Patent Application No. 19207408.3, European Search Report dated Dec. 17, 2019, 7 pages.
Samsung: "(TP for BL CR for TS 37.340): PDU Session Split in MR-DC", 3GPP Draft; R3-186578, 3rd Generation Partnership Project (3GPP), Nov. 12-16, 2018. Retrieved from the Internet: URL:http://www.3gpp.org/ftp/Meetings%5F3GPP%5FSYNC/RAN3/Docs/R3%2DI86578%2Ezip [retrieved on Nov. 11, 2018].

(Continued)

*Primary Examiner* — Kourosh Mohebbi
(74) *Attorney, Agent, or Firm* — Han Santos, PLLC; John H. Lin

(57) ABSTRACT

A base station of a dual connectivity cellular network is provided. The base station provides a first wireless connectivity of a first regulated wireless communication standard to a user equipment (UE) of a cellular network via a master node of the base station. User plane data is forwarded to the UE through the master node according to a first user plane path. The base station requests a secondary node to provide a second wireless connectivity of a second regulated wireless communication standard to the UE. When the master node is configured by a first configuration, the user plane data is forwarded to the UE through the secondary node according to the second user plane path that is established with the cellular network. When the master node is configured by a second configuration, the user plane data is forwarded to the UE through the secondary node according to the first user plane path.

20 Claims, 8 Drawing Sheets

(56) References Cited

OTHER PUBLICATIONS

ZTE: "Baseline CR for TS37.340", 3GPP Draft; R3-186267 37.340 BLCR, 3rd Generation Partnership Project (3GPP), Mobile Competence Centre; Oct. 8-12, 2018. Retrieved from the Internet: URL:http://www.3gpp.org/ftp/tsg%5Fran/WG3%5Flu/TSGR3%FI01bis/Docs/R3%2DI86267%2Ezip [retrieved on Oct. 25, 2018].

\* cited by examiner

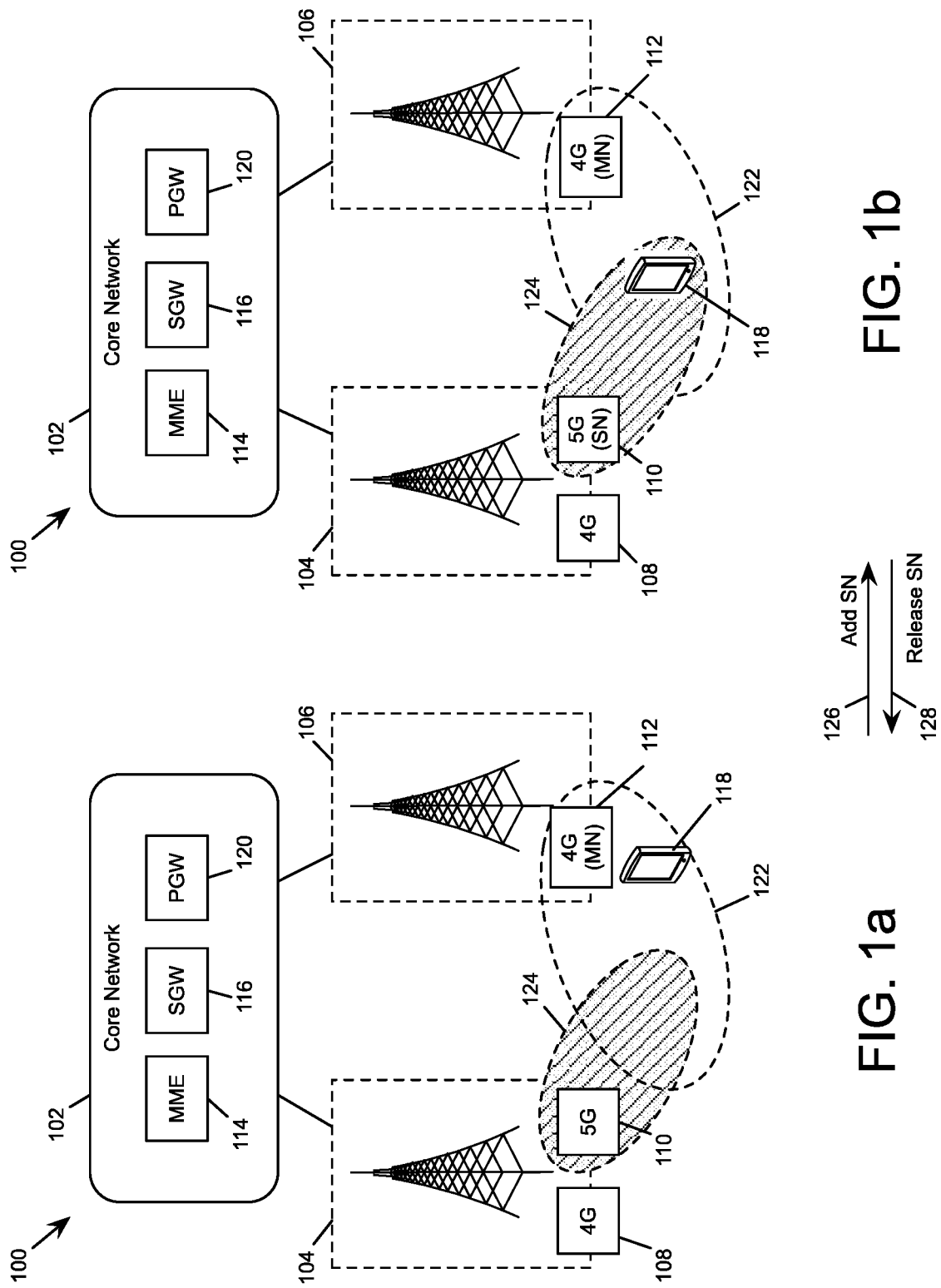

SIGNALING REDUCTION IN DUAL CONNECTIVITY NETWORKS

BACKGROUND

Fifth-generation wireless, or 5G, is the latest iteration of cellular technology, engineered to greatly increase the speed and responsiveness of wireless networks. As 5G is relatively new, base stations capable of providing 5G connectivity are not widely installed, and 5G coverage is relatively sparse. In contrast, base stations capable of providing 4G connectivity are widely installed, and 4G coverage is nearly ubiquitous.

An inexpensive way to provide 5G data coverage is to leverage existing Long-Term Evolution (LTE)/Fourth-Generation Wireless (4G) coverage infrastructure. For example, a cellular service provider may provide a dual connectivity cellular network in which 4G capable base stations are used to relay user plane data and control plane data to 5G capable user equipment (UE) through 5G-capable base stations. In these instances, a 4G capable base station is referred to as a master node (MN) and a 5G capable base station is referred to as a secondary node (SN). A 4G capable base station may dynamically request to add or release a 5G capable base station as an SN when the 4G capable base station detects a 5G capable UE moving in or out of 5G coverage.

The 3GPP TS 37.340 (Release 15) defines the Universal Terrestrial Radio Access Network (UTRAN) New Radio Dual Connectivity (EN-DC) secondary node addition procedure and release procedure in Section 10.2.1 and 10.4.1, respectively. These procedures specify the signaling that takes place among UE, MN, SN, and various components of the cellular network when an MN adds or releases an SN.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicate similar or identical items.

FIGS. 1a and 1b illustrate a dual connectivity cellular network in which an MN performs path update when adding or releasing an SN.

DETAILED DESCRIPTION

Figures 2A, 2B:
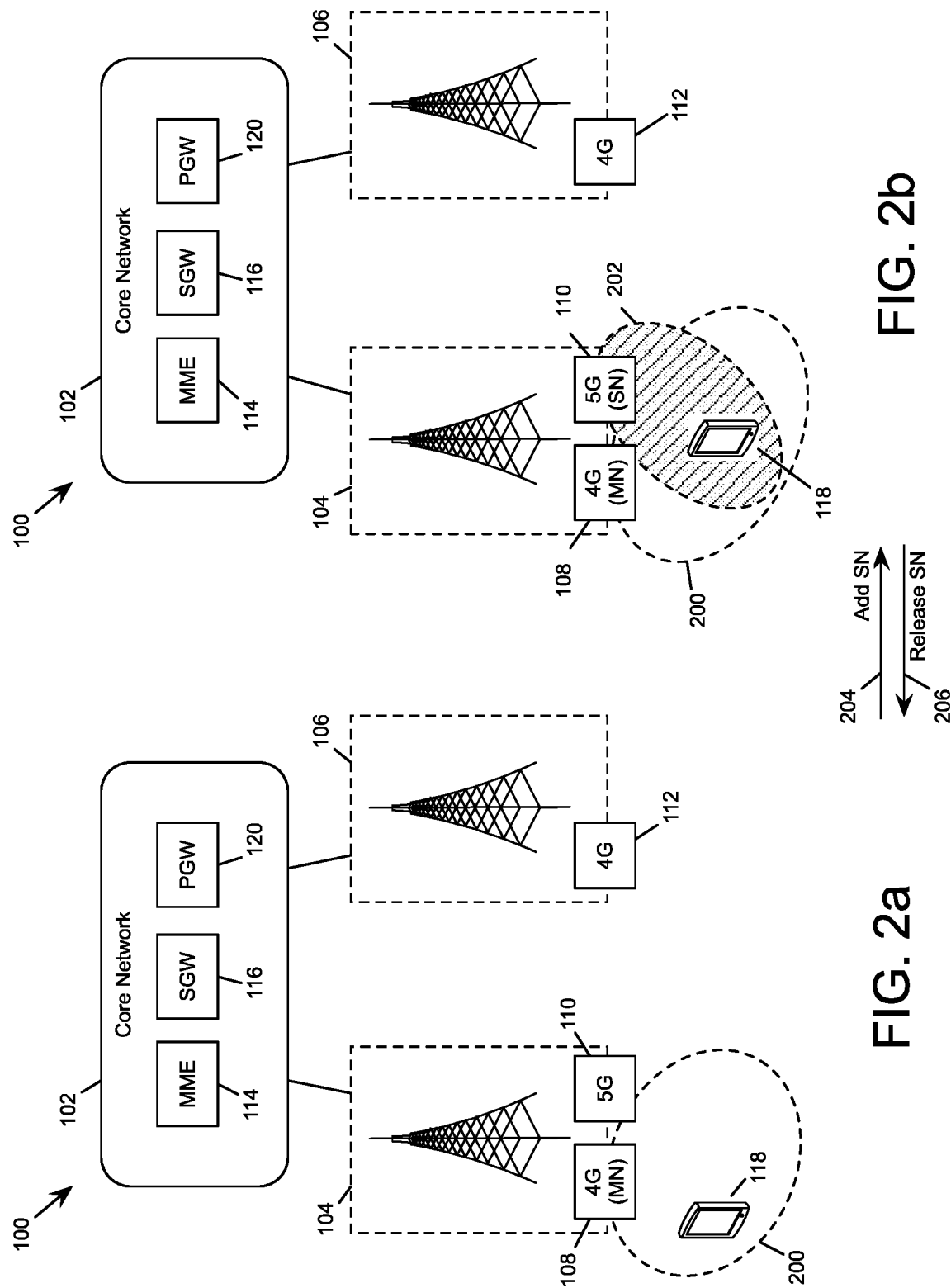
FIGS. 2a and 2b illustrate the dual connectivity cellular network in which an MN bypasses path update when adding or releasing an SN.

As the initial 5G coverage is expected to be limited, UEs may move in and out of 5G coverage quite frequently. For a dual connectivity network, the frequent movement in and out of 5G coverage corresponds to frequent additions and releases of SNs by MNs. The frequent additions and releases of SNs generate extra signaling load among MNs, SNs, UEs, and core network components. The extra signaling load may result in higher upkeep costs for a cellular service provider deploying a 5G network.

This disclosure is directed to a dual connectivity cellular network that reduces signaling when an MN is adding or releasing an SN. The procedure to add or release an SN includes a path update routine, which includes a set of data exchanges between the MN and the core network for switching a user plane path from the MN to the SN (or from the SN back to the MN). In some embodiments, the SN addition/release signaling is reduced by an MN that is configured to bypass the path update routine. Some embodiments determine whether to configure the MN to bypass the path update routine based on whether the 4G capable MN and the 5G capable SN are collocated, e.g., located at the same cellular tower or at nearby cellular towers.

FIGS. 1a and 1b illustrate a dual connectivity cellular network 100 in which an MN performs path update when adding or releasing an SN. As illustrated, the cellular network 100 includes a core network 102. Wireless access to the cellular network 100 is provided to subscribers through radio access networks (RAN) that are implemented at base stations. The base stations are installed at cellular towers such as cellular towers 104 and 106. The cellular tower 104 includes a 4G base station 108 and a 5G base station 110. The cellular tower 106 includes a 4G base station 112 but no 5G base station.

The core network 102 includes routers, switches, or other types of data forwarding elements for conducting data traffic (e.g., packet traffic) between various network endpoints such as UEs, base stations, hotspots, and other types of computing resources. The core network 102 may also provide access to external networks such as the Internet. The core network 102 may include components that provide services to the subscribers of the cellular network 100 as well as tracking positions of the UEs. The core network 102 may include a packet network, e.g., an Evolved Packet Core (EPC) that interconnects different components belonging to an Evolved Packet System (EPS). The EPC is a framework for providing converged voice and data on a 4G LTE network. EPC unifies voice and data on an Internet Protocol (IP) service architecture and voice is treated as just another IP application. This allows cellular operators to deploy and operate one packet network for 2G, 3G, wireless local area network (WLAN), and fixed access such as Ethernet, DSL, cable, and fiber.

The core network 102 includes a Mobility Management Element (MME) 114, a Serving Gateway (SGW) 116, and a Packet Gateway (PGW) 120. The MME 114 is a control plane component that manages session states, and the MME 114 also authenticates and tracks a UE across the cellular network 100. The MME 114 retains location information at the tracking area level for the UEs subscribed to the cellular network 100, such as the UE 118. The MME 114 also plays a role in the handover signaling between LTE and 2G/3G/5G networks. The SGW 116 is a user plane component that forwards and routes packets of user plane data between base stations and the PGW 120. The PGW 120 acts as the interface between the LTE network and other packet data networks and manages quality of service (QoS) and provides deep packet inspection (DPI).

The 4G base stations 108 and 112 provide radio access networks (RAN) for 4G technology that allows UEs to wirelessly access the core network 102. More specifically, the 4G base stations 108 and 112 are Evolved Node B (eNBs) of an LTE network capable of providing 4G wireless connectivity. An eNB is a base station that handles radio communications with multiple devices in the cellular network and carries out radio resource management and handover decisions. As part of a dual connectivity network, the 4G base stations 108 and 112 are configured to act as MNs and provide control plane data and user plane data to 5G base stations that serve as SNs.

The 5G base station 110 provides a Radio Access Network (RAN) that allows UEs to wirelessly access the core network 102. The 5G base station 110 is a Next Generation Node B (gNB) capable of providing 5G wireless connectivity based on 5G radio. A gNB may act as an SN and have its control plane and user plane data come from an eNB acting as an MN. A gNB may also receive user plane data directly without going through an MN.

FIGS. 1a and 1b illustrate a UE 118 being in and out of 5G coverage while staying in 4G coverage of the cellular network 100. The coverage area of the 4G wireless connectivity by the 4G base station 112 is illustrated as a coverage area 122. The coverage area of the 5G wireless connectivity by the 5G base station 110 is illustrated as a coverage area 124.

The UE 118 can be a smart phone, a computer, a mobile device, or a device that is capable of wireless communication. The UE 118 is also capable of wireless connectivity by both 4G radio and 5G radio. FIG. 1a illustrates the UE 118 as being in 4G coverage area 122 of the 4G base station 112 but not in 5G coverage area 124. FIG. 1b illustrates the UE 118 being in 5G coverage area 124 through the 5G base station 110, with the 5G base station 110 being an SN of the 4G base station 112.

The figures show a transition 126 from FIG. 1a to FIG. 1b, which corresponds to the UE 118 moving into the 5G coverage 124. When the UE 118 moves into the 5G coverage area 124, the 4G base station 112 acts as an MN and adds the 5G base station 110 as an SN through signaling among the MN, the SN, the UE 118, the MME 114, and the SGW 116. The signaling establishes the control plane path and the user plane path between the core network 102 and the UE 118. The signaling also includes a path update routine, which modifies the user plane path to go through the 5G base station 110 but not the 4G base station. 112. The modification of the user plane path will be described by reference to FIG. 3a below. The path update routine will be described by reference to FIG. 5 below.

The figures also show a transition 128 from FIG. 1b to FIG. 1a that corresponds to the UE 118 moving out of the 5G coverage area 124. When the UE 118 moves out of the 5G coverage area 124, the 4G base station 112 (as the MN) releases the 5G base station 110 (as an SN) through signaling among the MN, the SN, the UE 118, the MME 114, and the SGW 116. The signaling restores the control plane path and the user plane path between the core network 102 and the UE 118 through the 4G base station 112. The signaling also includes a path update routine, which modifies the user plane path to go through the 4G base station 112 but not the 5G base station 110. The modification of the user plane path will be described by reference to FIG. 3a below. The path update routine will be described by reference to FIG. 7 below.

In some embodiments, an MN in a dual connectivity network (such as the 4G base stations 108 and 112) may be configured to not perform the path update routine when adding or releasing an SN. By not performing the path update routine, the dual connectivity cellular network 100 may significantly reduce signaling load due to UEs moving in and out of 5G coverage. An administrator may configure a 4G base station as an MN to not perform the path update routine when adding or releasing a 5G base station as an SN when the MN and the SN are collocated, e.g., at a same cellular tower. When the MN and the SN are collocated, a first user plane path that directly connects the SN with the core network may be identical or similar to a second user plane path that goes through MN to reach SN, or at least have a very similar level of throughput performance. The administrator may therefore decide to configure the MN to bypass the path update routine in order to reduce signaling load due to UEs moving in and out of 5G coverage.

In some embodiments, the 4G base station automatically determines whether to perform the path update routine. The 4G base station may determine whether to perform the path update routine based on a configuration bit that is set by the user or is hard-coded. The 4G base station may determine whether to perform the path update routine by determining whether the 4G base station and the 5G base station are collocated, e.g., by examining whether the 4G base station and the 5G base station are installed at the same cellular tower, by examining an identifier of the 5G base station, or by examining a geographical coordinate of the 5G base station. If the identifier or the geographical coordinate of the 5G base station indicates that the 5G base station is collocated with the 4G base station, the 4G base station does not perform the path update routine.

In the example of FIG. 1a and FIG. 1b, the MN and the SN are not collocated as the 4G base station 112 that serves as the MN is installed at the cellular tower 106 and the 5G base station 110 that serves as the SN is installed at the cellular tower 104. Correspondingly, the 4G base station 112 is not configured to bypass the path update routine when adding the 5G base station 110 as an SN.

FIGS. 2a and 2b illustrate the dual connectivity cellular network 100 in which an MN bypasses path update when adding or releasing an SN. Specifically, the figure illustrates the UE 118 moving in and out of 5G coverage when the MN is configured to the bypass path update routine. The coverage area of the 4G wireless connectivity by the 4G base station 108 is illustrated as a coverage area 200. The coverage area of the 5G wireless connectivity by the 5G base station 110 is illustrated as a coverage area 202.

FIG. 2a illustrates the UE 118 being in 4G coverage area 200 through the 4G base station 108 but not in 5G coverage area 202. FIG. 2b illustrates the UE 118 as being in a 5G coverage area of the 5G base station 110, with the 5G base station 110 being an SN of the 4G base station 108.

In contrast to the example of FIGS. 1a and 1b, the 4G base station 108 that serves as the MN and the 5G base station 110 that serves as the SN are installed at the same cellular tower 104, i.e., the MN and the SN are collocated.

The figures show a transition 204 from FIG. 2a to FIG. 2b, which corresponds to the UE 118 moving into 5G coverage area 202. When the UE 118 moves into 5G coverage area 202 (provided by the 5G base station 110) from 4G coverage 200 (provided by the 4G base station 108), the 4G base station 108 acts as an MN and adds the 5G base station 110 as an SN through signaling among the MN, the SN, the UE 118, the MME 114, and the SGW 116. The signaling establishes the control plane path and the user plane path between the core network 102 and the UE 118 through the 4G base station 108 and the 5G base station 110. Since the 4G base station 108 is configured to bypass the path update routine, the user plane path is not modified further.

The figures also show a transition 206 from FIG. 2*b* to FIG. 2*a*, which corresponds to the UE 118 moving out of 5G coverage area 202. When the UE 118 moves out of the 5G coverage area 202 and back into 4G coverage, the 4G base station 108 (as the MN) releases the 5G base station 110 (as an SN) through signaling among the MN, the SN, the UE 118, the MIME 114, and the SGW 116. The signaling restores the control plane path and the user plane path between the core network 102 and the UE 118 through the 4G base station 108. Since the 4G base station 108 is configured to bypass the path update routine, the user plane path is not modified further.

Figure 3A:
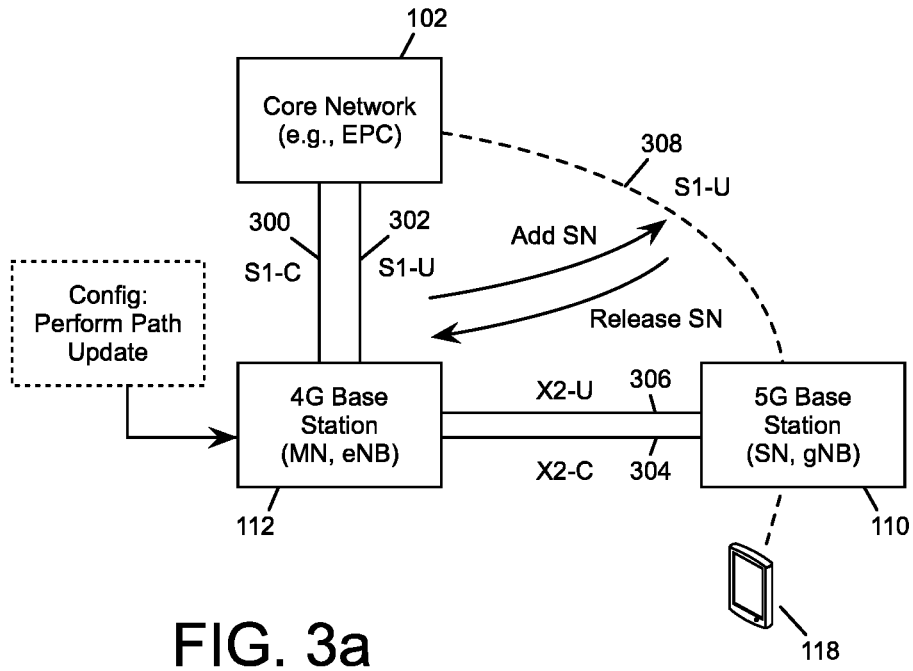
FIGS. 3a and 3b conceptually illustrate the control plane path and the user plane path of the dual connectivity network when a UE moves in and out of 5G coverage.
Figure 3B:
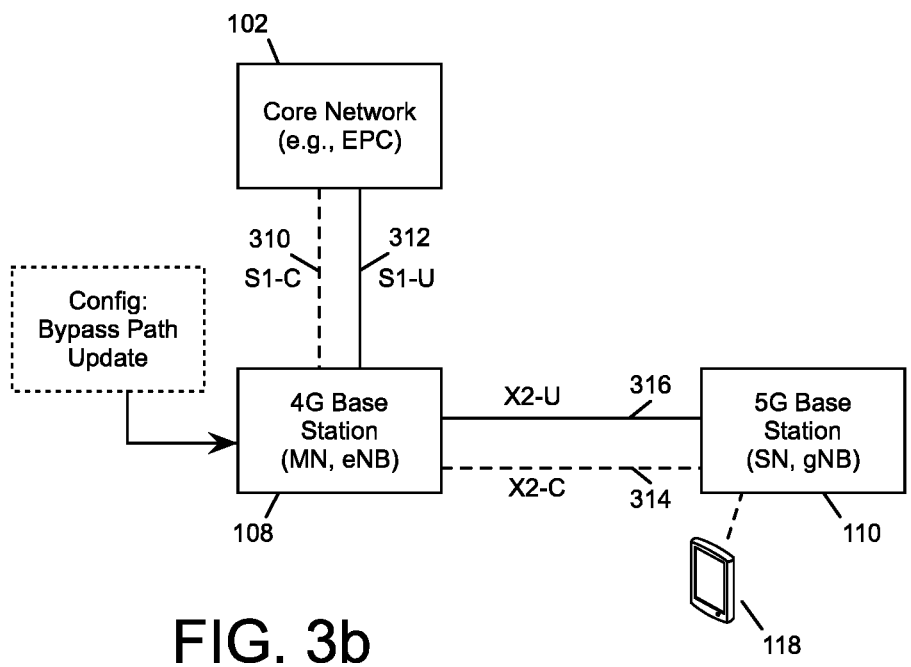

FIGS. 3*a* and 3*b* conceptually illustrate the control plane path and the user plane path of the dual connectivity network when a UE moves in and out of 5G coverage. FIG. 3*a* shows the modification of the user plane path when the MN is configured to perform the path update routine. FIG. 3*b* shows the modification of the user plane path when the MN is configured not to perform the path update routine.

FIG. 3*a* corresponds to the example of FIGS. 1*a* and 1*b*. As illustrated, the core network 102 establishes a control plane path 300 (S1-C interface) and a user plane path 302 (S1-U interface) with the 4G base station 112. The 4G base station 112 in turn establishes a control plane path 304 (X2-C interface) and a user plane path 306 (X2-U interface) with the 5G base station 110. Thus, the core network 102 may forward control plane data and user plane data through the 4G base station 112 to the 5G base station 110.

The 4G base station 112 is configured to perform a path update routine when it adds or releases the 5G base station as an SN. When the 4G base station 112 adds the 5G base station 110 as the SN, the path update routine establishes a separate user plane path 308 (S1-U interface) directly from the core network 102 to the 5G base station 110 without going through the 4G base station 112. When the 4G base station 112 releases the 5G base station 110, the path update routine deletes the separate user plane path 308.

FIG. 3*b* corresponds to the example of FIGS. 2*a* and 2*b*. As illustrated, the core network 102 establishes a control plane path 310 (S1-C interface) and a user plane path 312 (S1-U interface) with the 4G base station 108. The 4G base station 108 in turn establishes a control plane path 314 (X2-C interface) and a user plane path 316 (X2-U interface) with the 5G base station 110. Thus, the core network 102 may forward control plane data and user plane data through the 4G base station 108 to the 5G base station 110.

In contrast to the 4G base station 112, the 4G base station 108 is configured to bypass the path update routine when it adds or releases the 5G base station 110 as an SN. Consequently, regardless of whether the 4G base station 108 adds or releases the 5G base station 110 as an SN, the path update routine is not performed. Thus, a separate user plane path directly connecting the core network 102 and the 5G base station 110 is not established, and the user plane path 312 is used to forward user data to the UE 118.

Example Base Station

Figure 4:
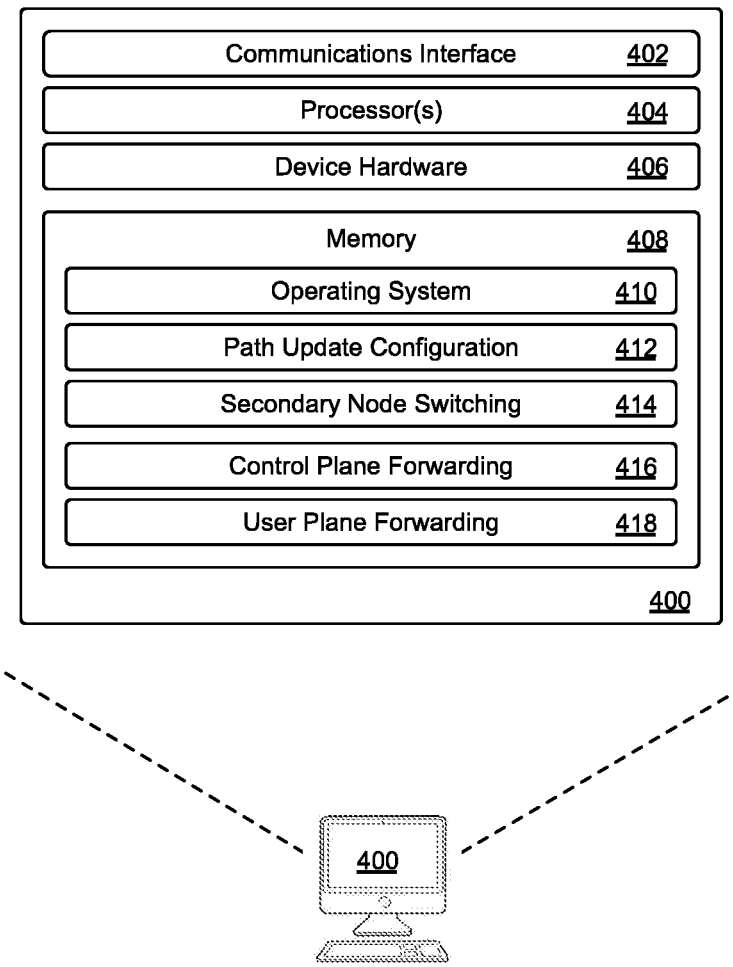
FIG. 4 is a block diagram showing various components of an example computing device implementing a 4G base station of a dual connectivity network that may be configured to perform or bypass the path update routine.

FIG. 4 is a block diagram showing various components of an example computing device 400 implementing a 4G base station of a dual connectivity network that may be configured to perform or bypass the path update routine. The base station computing device 400 may be a general-purpose computer, such as a desktop computer, tablet computer, laptop computer, or a server that is capable of receiving inputs, processing the inputs, and generating output data. The computing device 400 may also be a virtual computing device in the form of virtual machines or software containers that are hosted in a cloud.

The computing device 400 may be equipped with a communications interface 402, one or more processors 404, device hardware 406, and memory 408. The communications interface 402 may include wireless and/or wired communication components that enable the computing devices to transmit data to and receive data from other devices, whether through a dedicated wired connection or via a communications network. The device hardware 406 may include additional hardware that performs user interface, data display, data communication, data storage, and/or other server functions.

The memory 408 may be implemented using computer-readable medium, such as a computer storage medium. Computer-readable medium includes, at least, two types of computer-readable media, namely computer storage media and communications media. Computer storage media may include volatile and non-volatile, removable and non-removable media implemented in any method or technology for storage of information such as computer-readable instructions, data structures, program modules, or other data. Computer storage media may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium that can be used to store information for access by a computing device. In contrast, communication media may embody computer-readable instructions, data structures, program modules, or other data in a modulated data signal, such as a carrier wave, or other transmission mechanisms.

The processor(s) 404 and the memory 408 of the computing device 400 may implement an operating system 410, a path update configuration module 412, a secondary node switching module 414, a control plane forwarding module 416, and a user plane forwarding module 418. The operating system 410 may include components that enable the computing device 400 to receive and transmit data via various interfaces (e.g., user controls, communications interface, and/or memory input/output devices), as well as process data using the processors 404 to generate output. The operating system 410 may include a presentation component that presents the output (e.g., display the data on an electronic display, store the data in memory, transmit the data to another electronic device, etc.). Additionally, the operating system 410 may include other components that perform various additional functions generally associated with an operating system.

The path update configuration module 412 indicates the current configuration of the 4G base station regarding whether to perform a path update routine. In some embodiments, the computing device 400 is a region in the memory 408 that stores one or more control bits at the path update configuration module 412 to select whether to perform the path update routine or to bypass the path update routine. In some embodiments, the path update configuration module 412 is a program or a set of instructions that determines whether to perform that path update routine, by e.g., determining whether the 5G station that is added as an SN is collocated with the 4G base station. In some embodiments, the path update configuration module 412 provides a user interface for an administrator to configure the 4G base station to either perform the path update routine or to bypass the path update routine.

The secondary node switching module 414 is a program or a set of instructions that controls the signaling of the 4G base station as an MN with components of the core network 102 in order to add or release a 5G base station as an SN. Such signaling may include SN addition request signaling with the 5G base station, connection reconfiguration signaling with the UE, SN status transfer signaling with the SN, as well as path update routine signaling with the core network 102. The signaling by the 4G base station as an MN when adding or releasing an SN will be further described by reference to FIG. 5 and FIG. 7.

The control plane forwarding module 416 is a program or a set of instructions that controls the forwarding of control plane data between the UE and the core network 102. When the 4G base station has added a 5G base station as an SN to provide 5G coverage, the control plane forwarding module forwards control plane data between the core network 102 and the 5G base station (and thereby to the UE). When the 4G base station is not using the 5G base station as an SN (e.g., has released the 5G base station), the control plane forwarding module 416 forwards control plane data between the core network 102 and the UE (e.g., through the X2-C interface).

The user plane forwarding module 418 is a program or a set of instructions that controls the forwarding user plane data between the core network 102 and the UE. The behavior of the user plane forwarding module 418 is determined by the content or the output of the path update configuration module 412. When the path update configuration module 412 indicates that path update routine is to be performed, the user plane forwarding module 418 permits the core network 102 to forward user plane data directly to the 5G base station and the UE without going through the 4G base station. When the path update configuration module 412 indicates that a path update routine is not to be performed, the user plane forwarding module 418 forwards user plane data from the core network to the 5G base station and the UE (e.g., through the X2-U interface).

Figure 5:
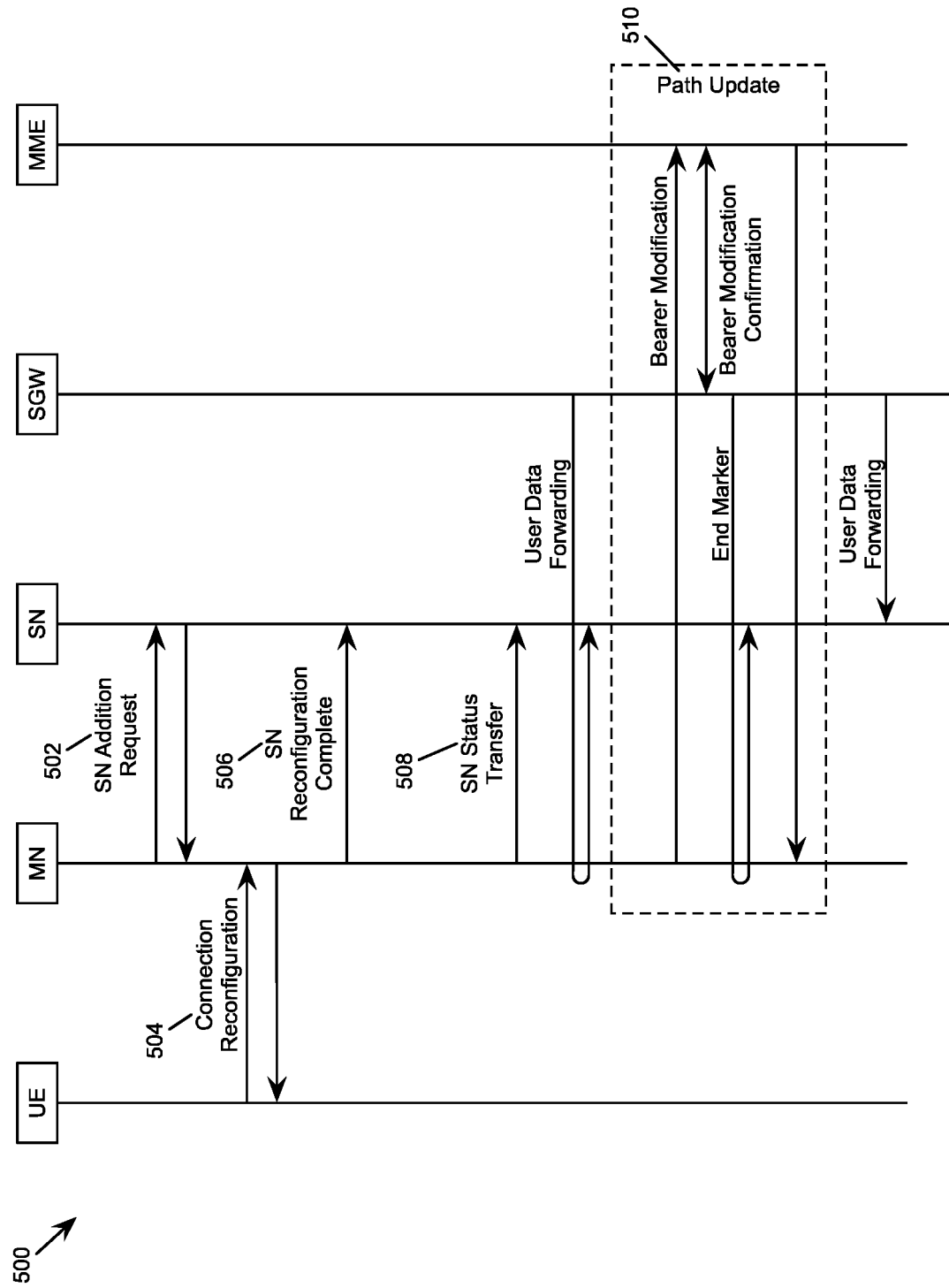
FIG. 5 is a signaling diagram showing a signaling sequence that takes place in a dual connectivity network when a 4G base station acting as the MN adds a 5G base station that acts as the SN to provide 5G coverage to a UE.

FIG. 5 is a signaling diagram showing a signaling sequence 500 that takes place in a dual connectivity network when a 4G base station adds a 5G base station to provide 5G coverage. The diagram shows the signaling between a UE (e.g., the UE 118), an MN (e.g., the 4G base station 108 or 112), an SN (e.g., the 5G base station 110), an MME (e.g., the MME 114), and an SGW (e.g., the SGW 116). The signaling sequence includes several phases: SN addition request, Connection reconfiguration, SN reconfiguration complete, SN status transfer, and Path update. The signaling diagram also shows the path of user data forwarding before the Path Update phase and after the Path Update phase.

During the SN addition request phase 502, the MN requests the SN to allocate radio resources for a specific signal bearer (a bearer refers to a path that user traffic uses to pass a transport network, e.g., Evolved UTRAN Radio Access Bearer, or E-RAB), indicating the signal bearer's characteristics. The MN indicates the requested radio resource configuration information, including UE capabilities and UE capability coordination results. The MN may also provide the latest measurement results for the SN to choose and configure the radio resource(s). If the SN is able to admit the resource request, it allocates respective radio resources and, depending on the bearer option, respective transport network resources. If radio resources have been requested, the radio resource configuration is provided.

During the Connection reconfiguration phase 504, the MN sends a Connection reconfiguration message to a UE. The UE in turn applies the new configuration and replies to the MN with a Connection Reconfiguration Complete message.

During the SN reconfiguration complete phase 506, the MN informs the SN that the UE has completed the reconfiguration procedure successfully. During the SN Status Transfer phase 508, the MN sends a status to the SN. The MN may then take action to minimize service interruption due to the activation of a dual connectivity network.

During the path update phase 510, the MN performs the path update routine, which includes a set of data exchanges between the MN and the core network for switching a user plane path from the MN to the SN. Specifically, the MN communicates with the MME to perform signal bearer modification, i.e., to modify the user plane path by which user plane data is forwarded to the UE. The MME in turn communicates with the SGW to confirm the signal bearer modification, and the SGW sends an End Marker through the MN to the SN. Prior to the path update phase 510, the user plane data is forwarded to the UE through the MN and the SN. The path update routine modifies the user plane path at the MME so that user plane data between the core network and the UE is forwarded through the SN without going through the MN (as illustrated in FIG. 3*a*). An MN that is configured to perform the path update routine (e.g., the 4G base station 112) performs the path update routine to modify the user plane path when adding an SN to provide 5G coverage.

On the other hand, an MN that is configured to not perform the path update routine (e.g., the 4G base station 108) does not communicate with the MME to perform bearer modification when adding an SN to provide 5G coverage. The user plane path by which the user plane data is forwarded to the UE is not modified, and the user plane data between the UE and the core network continues to be forwarded through both the MN and the SN (as illustrated in FIG. 3*b*).

Figure 6:
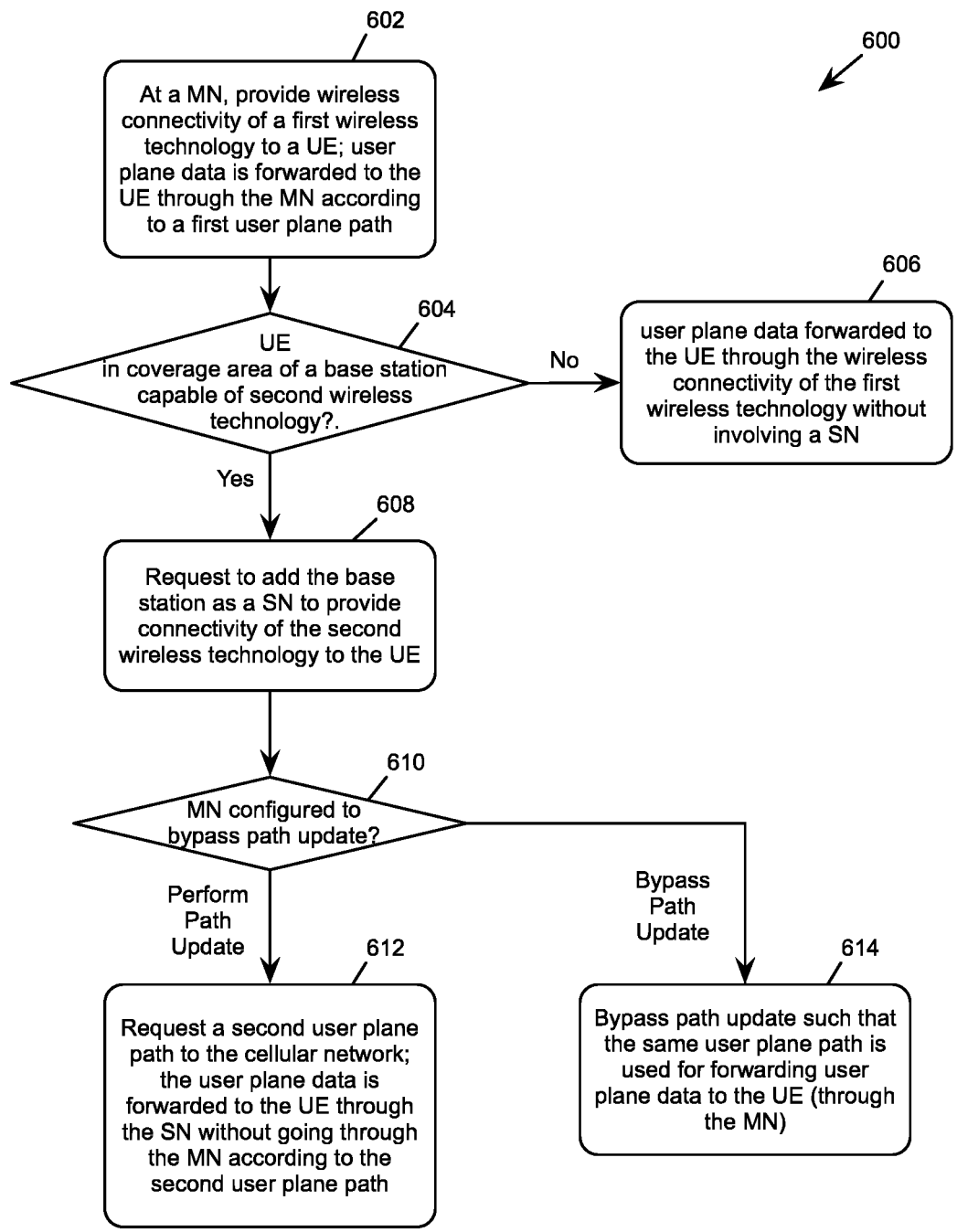
FIG. 6 is a flow diagram of an example process performed by a 4G base station that may be configured to perform or bypass path update when adding a 5G base station to provide 5G coverage to a UE.

FIG. 6 is a flow diagram of an example process 600 performed by a 4G base station when adding a 5G base station to provide 5G coverage to a UE. More generally, the example process 600 is performed by an MN that supports a first regulated wireless communications standard communication standard when the MN adds an SN that supports a second regulated wireless communication standard. In this context, a regulated communication standard is a standard that governs one or more frequency bands that have been designated for terrestrial cellular network telecommunication by a government body, such as the Federal Communications Commission (FCC).

The process 600 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like, that perform particular functions or implement particular abstract data types. The order in which the operations are described is not intended to be construed as a limitation, and any number of the described blocks can be combined in any order and/or in parallel to implement the process.

At block 602, the MN provides wireless connectivity of the first regulated wireless communications standard (e.g., 4G/LTE) to a UE. User plane data is forwarded to the UE through the MN according to a first user plane path (or a first E-RAB).

At block 604, the MN determines whether the UE is in the coverage area of a base station capable of providing connectivity of a second regulated wireless communications standard. If the UE is in coverage area of a base station of second regulated wireless communications standard, the process proceeds to block 608. Otherwise, the process proceeds to block 606.

At block 606, the MN forwards user plane data to the UE through the wireless connectivity of the first regulated wireless communications standard without involving an SN. At block 608, the MN requests to add the base station as an SN in order to provide connectivity of the second regulated wireless communications standard to the UE. The MN also reconfigures the SN for wireless communications with the UE. This sets up the UE to receive user plane data and control plane data that are relayed by the MN and the SN.

At block 610, the MN determines whether the MN is configured to bypass the path update routine. The MN may then determine whether to perform the path update routine based on a configuration bit that is set by the user or is hard-coded. The MN may determine whether to perform the path update routine by determining whether the MN and the SN are collocated, e.g., if the SN is collocated with the MN, the MN does not perform the path update routine. If the MN is configured to perform the path update routine, the process proceeds to block 612. If the MN is configured to bypass the path update routine, the process proceeds to block 614.

At the block 612, the MN performs the path update routine by requesting a new, second user plane path to the core network, and the user plane data is forwarded to the UE through the SN (without going through the MN) according to the second user plane path. In some embodiments, the MN performs the path update routine by contacting the MME of the core network to modify the user plane path that is used to forward user plane data to the UE. The modified user plane path is through the SN but not the MN.

At the block 614, the MN bypasses the path update routine such that the same user plane path is used for forwarding user plane data to the UE. In other words, the core network continues to use the user plane path through MN to forward user plane data to the UE.

Figure 7:
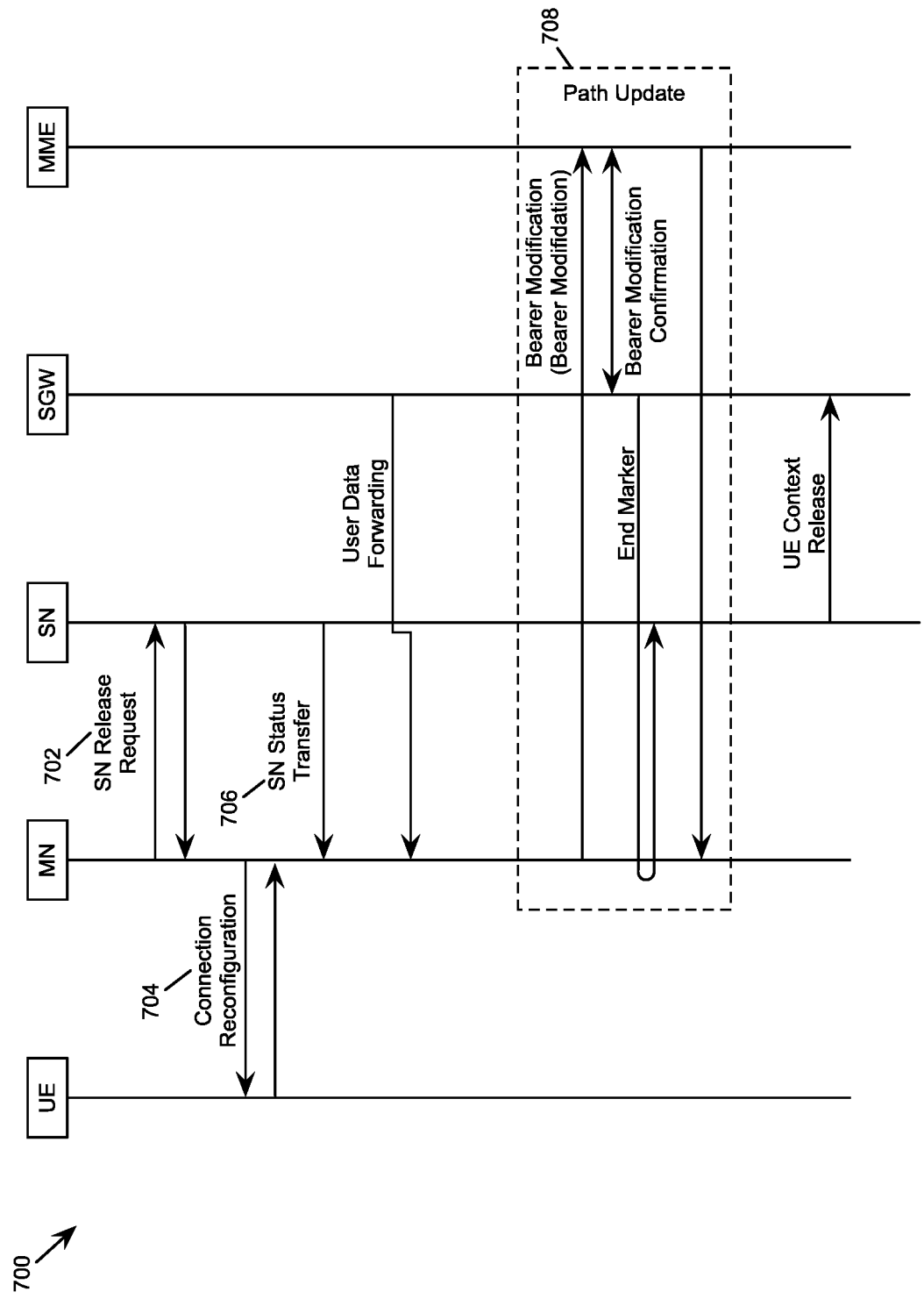
FIG. 7 is a signaling diagram showing a signaling sequence that takes place in a dual connectivity network when a 4G base station releases a 5G base station.

FIG. 7 is a signaling diagram showing a signaling sequence 700 that takes place in a dual connectivity network when a 4G base station releases a 5G base station. The signaling sequence includes several phases: SN release request, connection reconfiguration, SN Status Transfer, Path Update, and UE Context Release. The signaling diagram also shows the path of user data forwarding before the Path Update phase.

During the SN Release Request phase 702, the MN sends an SN Release Request message. If data forwarding is requested, the MN provides data forwarding addresses to the SN. The SN confirms the SN Release Request message by sending an SN Release Request Acknowledge message.

During the Connection Reconfiguration phase 704, the MN indicates in a connection reconfiguration message to the UE that the UE shall release radio resource configuration. During the SN status transfer phase 706, the SN sends status to the MN. Data forwarding from the SN to the MN also takes place.

During the Path Update phase 708, the MN performs the path update routine, which includes a set of data exchanges between the MN and the core network for switching a user plane path from the SN back to the MN. Specifically, the MN communicates with the MME to perform signal bearer modification, i.e., to modify the user plane path by which user plane data is forwarded to the UE. The MME in turn communicates with the SGW to confirm the signal bearer modification, and the SGW sends an end marker through the MN to the SN. Prior to the Path Update phase, the user plane data is forwarded to the UE through the SN without going through the MN. The path update routine modifies the user plane path at the core network so that user plane data between the core network and the UE is forwarded through the MN. An MN that is configured to perform the path update routine (e.g., the 4G base station 112) performs the path update routine to modify the user plane path when releasing an SN. An MN that is configured to not perform the path update routine (e.g., the 4G base station 108) does not communicate with the MME to perform bearer modification when releasing an SN. The user plane path by which the user plane data is forwarded to the UE is not modified.

Figure 8:
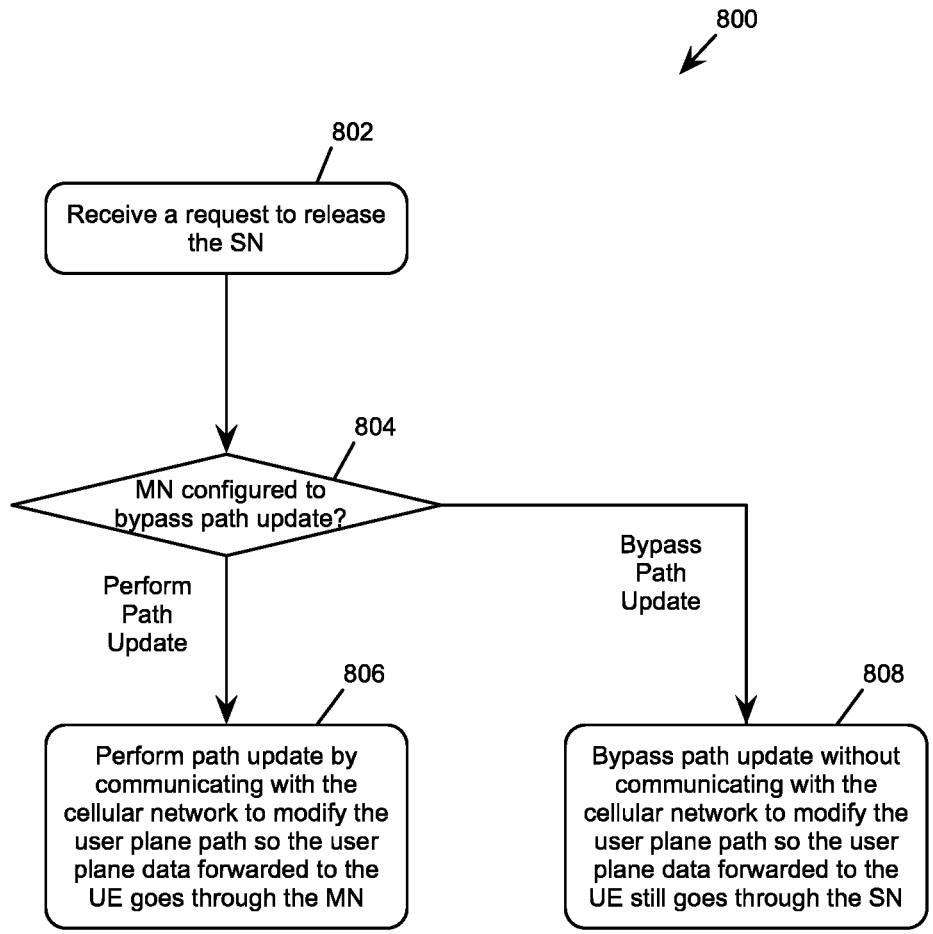
FIG. 8 is a flow diagram of an example process performed by a 4G base station that may be configured to perform or bypass path update when releasing a 5G base station.

FIG. 8 is a flow diagram of an example process 800 performed by a 4G base station when releasing a 5G base station. More generally, the example process 800 is performed by an MN that supports a first regulated wireless communication standard when the MN releases an SN that supports a second regulated wireless communication standard from providing connectivity to a UE.

The process 800 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like, that perform particular functions or implement particular abstract data types. The order in which the operations are described is not intended to be construed as a limitation, and any number of the described blocks can be combined in any order and/or in parallel to implement the process.

Prior to the process 800, the MN may add the SN in order to provide connectivity of the second regulated wireless communications standard to the UE. The MN may be configured to bypass the path update routine such that user plane data is forwarded to the UE according to a first user plane path that includes both the MN and the SN. The MN may also be configured to perform a path update routine such that the user plane data is forwarded to the UE according to a second user plane path that includes the SN but not the MN.

At block 802, the MN receives a request to release the SN. The MN may initiate the release of the SN, or the MN may receive the request to release the SN from the SN. The request to release the SN may be generated by the SN or the MN when the MN or the SN detects that the UE has moved out of the coverage area of the second regulated wireless communications standard.

At block 804, the MN determines whether it is configured to bypass the path update routine. If the MN is configured to perform the path update routine, the process proceeds to block 806. If the MN is configured to bypass the path update routine, the process proceeds to block 808.

At block 806, the MN performs a path update routine by communicating with the core network to modify the user plane path so that the user plane data forwarded to the UE goes through the MN. In some embodiments, the MN contacts the MME of the core network to modify the user plane path. The modified user plane path is a path from the core network to the UE through the MN without going through the SN.

At block 808, the MN bypasses the update routine without communicating with the cellular network to modify the user plane path. In some embodiments, the MN bypasses the path update routine such that the user plane path used by the MME for forwarding user plane data to the UE remains the same. The user plane path remains a path from the core network to the UE through the SN without going through the MN.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A base station comprising:
   one or more processors; and
   a computer-readable storage medium storing a plurality of computer-executable components that are executable by the one or more processors to perform a plurality of actions, the plurality of actions comprising:
   providing a first wireless connectivity of a first regulated wireless communication standard to a user equipment (UE) of a cellular network via a master node of the base station, wherein user plane data is forwarded to the UE through the master node according to a first user plane path;
   determining whether the master node and a secondary node are collocated at a same cellular tower of the base station;
   requesting a secondary node to provide a second wireless connectivity of a second regulated wireless communication standard to the UE, wherein:
   if the master node and the secondary node are not collocated at a same cellular tower of the base station, the user plane data is forwarded to the UE through the secondary node according to a second user plane path that is established with the cellular network; and
   if the master node and the secondary node are collocated at a same cellular tower of the base station, the user plane data is forwarded to the UE through the secondary node according to the first user plane path.

2. The base station of claim 1, wherein the master node is configured by a first configuration if the master node and the secondary node are not collocated at a same cellular tower of the base station or if the first user plane path and the second user plane path are different.

3. The base station of claim 2, wherein the master node is configured by a second configuration if the master node and the secondary node are collocated at a same cellular tower of the base station.

4. The base station of claim 1, wherein control plane data is forwarded to the UE through the master node and the secondary node.

5. The base station of claim 2, wherein when the master node is configured by the first configuration, the user plane data is forwarded to the user equipment through the secondary node without going through the master node.

6. The base station of claim 3, wherein when the master node is configured by the second configuration, the user plane data is forwarded to the secondary node from the master node.

7. The base station of claim 3, wherein when the master node is configured by the second configuration, the master node does not communicate the second user plane path to the cellular network.

8. The base station of claim 1, wherein requesting the secondary node to provide the second wireless connectivity to the UE comprises providing information regarding the first user plane path and the UE to the secondary node.

9. A computer-implemented method, comprising:
   providing a first wireless connectivity of a first regulated wireless communication standard to a user equipment (UE) of a cellular network via a master node of a base station, wherein user plane data is forwarded to the UE through the master node according to a first user plane path;
   determining whether the master node and a secondary node are collocated at a same cellular tower of the base station;
   requesting a secondary node to provide a second wireless connectivity of a second regulated wireless communication standard to the UE, wherein:
   if the master node and the secondary node are not collocated at a same cellular tower of the base station, the user plane data is forwarded to the UE through the secondary node according to a second user plane path that is established with the cellular network; and
   if the master node and the secondary node are collocated at a same cellular tower of the base station, the user plane data is forwarded to the UE through the secondary node according to the first user plane path.

10. The computer-implemented method of claim 9, wherein the master node is configured by a first configuration if the master node and the secondary node are not collocated at a same cellular tower or when the first user plane path and the second user plane path are different.

11. The computer-implemented method of claim 10, wherein the master node is configured by a second configuration if the master node and the secondary node are collocated at a same cellular tower.

12. The computer-implemented method of claim 9, wherein control plane data is forwarded to the UE through the master node and the secondary node.

13. The computer-implemented method of claim 10, wherein, when the master node is configured by the first configuration, the user plane data is forwarded to the secondary node without going through the master node.

14. The computer-implemented method of claim 11, wherein, when the master node is configured by the second configuration, the user plane data is forwarded to the secondary node from the master node.

15. The computer-implemented method of claim 11, wherein when the master node is configured by the second configuration, the master node does not communicate the second user plane path to the cellular network.

16. The computer-implemented method of claim 9, wherein requesting the secondary node to provide the second wireless connectivity to the UE comprises providing information regarding the first user plane path and the UE to the secondary node.

17. One or more non-transitory computer-readable storage media of a computing device storing computer-executable instructions that upon execution cause one or more processors to perform acts comprising:

providing a first wireless connectivity of a first regulated wireless communication standard to a user equipment (UE) of a cellular network via a master node of a base station, wherein user plane data is forwarded to the UE through the master node according to a first user plane path;

determining whether the master node and a secondary node are collocated at a same cellular tower of the base station;

requesting a secondary node to provide a second wireless connectivity of a second regulated wireless communication standard to the UE, wherein:

if the master node and the secondary node are not collocated at a same cellular tower of the base station, the user plane data is forwarded to the UE through the secondary node according to a second user plane path that is established with the cellular network; and if the master node and the secondary node are collocated at a same cellular tower of the base station, the user plane data is forwarded to the UE through the secondary node according to the first user plane path.

18. The one or more non-transitory computer-readable storage media of claim 17, wherein:

the master node is configured by a first configuration if the master node and the secondary node are not collocated at a same cellular tower or when the first user plane path and the second user plane path are different, and the master node is configured by a second configuration if the master node and the secondary node are collocated at a same cellular tower.

19. The one or more non-transitory computer-readable storage media of claim 18, wherein:

when the master node is configured by the first configuration, the user plane data is forwarded to the secondary node without going through the master node; and when the master node is configured by the second configuration, the user plane data is forwarded to the secondary node from the master node.

20. The one or more non-transitory computer-readable storage media of claim 18, wherein when the master node is configured by the second configuration, the master node does not communicate the second user plane path to the cellular network.

* * * * *